United States Patent
Dunn

(10) Patent No.: US 9,619,990 B2
(45) Date of Patent: Apr. 11, 2017

(54) SMART OUTPUT PROTECTOR

(71) Applicant: Junior Dunn, McDonough, GA (US)

(72) Inventor: Junior Dunn, McDonough, GA (US)

( * ) Notice: Subject to any disclaimer, the term of this patent is extended or adjusted under 35 U.S.C. 154(b) by 415 days.

(21) Appl. No.: 14/479,710

(22) Filed: Sep. 8, 2014

(65) Prior Publication Data

US 2016/0020596 A1  Jan. 21, 2016

Related U.S. Application Data

(60) Provisional application No. 61/874,820, filed on Sep. 6, 2013.

(51) Int. Cl.
  *G08B 21/18* (2006.01)
  *H04L 12/10* (2006.01)
  *H02H 3/08* (2006.01)
  *H02H 7/20* (2006.01)
  *H02H 1/00* (2006.01)

(52) U.S. Cl.
  CPC ............ *G08B 21/185* (2013.01); *H04L 12/10* (2013.01); *H02H 1/0092* (2013.01); *H02H 3/08* (2013.01); *H02H 7/20* (2013.01)

(58) Field of Classification Search
  CPC .......... H02H 3/08; H02H 7/20; H02H 1/0092; G08B 21/185; H04L 12/10
  See application file for complete search history.

(56) References Cited

U.S. PATENT DOCUMENTS

| | | | | | |
|---|---|---|---|---|---|
| 5,576,630 | A | * | 11/1996 | Fujita | G01R 31/2886 324/754.07 |
| 5,631,795 | A | * | 5/1997 | Koyama | G08B 26/005 340/635 |
| 5,644,283 | A | * | 7/1997 | Grosse-Wilde | H02H 9/026 338/20 |
| 5,754,103 | A | * | 5/1998 | Kanai | G08B 29/06 340/3.42 |
| 5,859,772 | A | * | 1/1999 | Hilpert | H02H 7/1227 327/405 |
| 6,738,246 | B1 | * | 5/2004 | Strumpler | H02H 3/025 361/102 |
| 7,319,280 | B1 | * | 1/2008 | Landry | H02J 13/002 307/3 |

* cited by examiner

*Primary Examiner* — Zeev V Kitov
(74) *Attorney, Agent, or Firm* — Mathew L. Grell; Grell & Watson Patent Attorneys

(57) ABSTRACT

A smart output protector device includes a data positive input, a data positive output, a data negative input, a data negative output, a first resistor, and a first normally closed relay. The first resister blocks direct short circuits. The first normally closed relay separates the smart output protector device when opened.

16 Claims, 12 Drawing Sheets

SMART OUTPUT PROTECTOR

CROSS-REFERENCE TO RELATED APPLICATIONS

To the full extent permitted by law, the present U.S. Non-provisional patent application hereby claims priority to and the full benefit of United States Provisional Application entitled "Smart Output Protection," having assigned Ser. No. 61/874,820, filed on Sep. 6, 2013, incorporated herein by reference in its entirety.

TECHNICAL FIELD OF THE INVENTION

The disclosure generally relates to fire alarm data loops, burglary alarms, power supplies and/or access controls, and more specifically to a smart output protector for separating such fire alarm data loops, burglary alarms, power supplies and/or access controls from short circuits.

BACKGROUND OF THE INVENTION

A fire alarm system is a set of electric/electronic devices/equipment working together to detect and alert people through visual and audio appliances when smoke/fire is present. These alarms may be activated from smoke detectors, heat detectors, water flow sensors, which are automatic or from a manual fire alarm pull station. A burglar alarm, also known as a security alarm, or security system, is a system designed to detect intrusion or unauthorized entry into a building or area. Burglar alarms are used in residential, commercial, industrial, and military properties for protection against burglary (theft) or property damage, as well as personal protection against intruders. In the fields of physical security and information security, access control is the selective restriction of access to a place or other resource. The act of accessing may mean consuming, entering, or using. Permission to access a resource is called authorization. Locks and login credentials are two analogous mechanisms of access control.

Currently, when any of these systems acquires a short or short circuit, the whole system is typically shut down until the short is removed. For example, with a fire alarm, a fire alarm isolation module is a device used only for that purpose, i.e. to isolate a short circuit on the data loop. While a fire alarm isolation module protects the panel, all devices on the data loop stop functioning and therefore the building is left unprotected. These systems, whether it be, fire, burglar, access control, the like, etc., when shut down completely leaving the building unprotected is clearly an undesirable result of a short circuit. As such, there is clearly a need for a device that separates the short circuited device while still maintaining the function of the system (fire, burglar, access control, the like, etc.).

The instant disclosure is designed to provide a smart output protector for fire alarm data loops, burglary alarms, power supplies, access controls, the like, or combinations thereof, that addresses at least some of the above mentioned problems.

SUMMARY

Briefly described, in select embodiments, the present disclosure of a smart output protector device may be used for protecting fire alarm data loops, burglary alarms, power supplies, access controls, the like, or other data or power loops desiring separation from short circuits. The smart output protector device includes a data positive input, a data positive output, a data negative input, a data negative output, a first resistor, and a first normally closed relay. The first resister blocks direct short circuits. The first normally closed relay separates the smart output protector device when opened.

In one embodiment, the first resistor may be interconnected between the data positive input and one side of the first normally closed relay, and the other side of the first normally closed relay may be connected to the data positive output. When a short circuit is present, the first relay may open and disconnect the data positive input from the data positive output of the smart output protector device.

One feature may be when the smart output protector device may be interconnected between a data output loop and a data component, and the data component is short circuited, the smart output protector device may separate the short circuited data component from the data output loop.

In select optional embodiments, a green data LED may be included for indicating that the data circuit is normal and/or a red data LED may be included for indicating that a short circuit is present in the data circuit. In these embodiments, a second resistor may be included for limiting the voltage to the green data LED, and/or a third resistor may be included for limiting the voltage to the red data LED.

In other select optional embodiments, a lamp may be included for indicating the status of the circuit and helping to auto reset the circuit when a short is no longer present. In these embodiments, a fourth resistor may be included for limiting the voltage to the lamp.

Another feature of the smart output protector device may be the inclusion of at least one resettable data fuse. The resettable data fuse or fuses may be interconnected between the first relay and the data positive output. The resettable data fuse or fuses may open the connection between the first relay and the data positive output upon a short circuit.

Another feature of the smart output protector device may be the inclusion of a first voltage regulator. The first voltage regulator may be used to trigger the first normally closed relay when a short circuit occurs, whereby the first voltage regulator may provide a constant voltage to the first relay for maintaining it open until a short is removed.

Another feature of the smart output protector device may be the inclusion of a fifth resistor, where the fifth resistor may be connected in parallel or series with the first resistor, limiting power once there is a short circuit thereby blocking direct short circuits.

Another feature of the smart output protector device may be the inclusion of at least one or more diode or diodes, connected in parallel with the first resistor for stabilizing the voltage.

In select embodiments, the smart output protector device may include a second normally closed relay, and a second voltage regulator in communication with the second normally closed relay. In these embodiments, the second normally closed relay and the second voltage regulator may be connected in parallel with the first normally closed relay and the first voltage regulator.

In other select embodiments, the smart output protector device may include a data input terminal box and a data output terminal box. The data input terminal box may house the data positive input and the data negative input. The data output terminal box may house the positive data output and the negative data output.

In select embodiments, the smart output protector device may include a power positive input, a power positive output, a power negative input, a power negative output, and at least one power resettable fuse. The power resettable fuse or fuses may be interconnected between the power positive input and the power positive output. In these embodiments, when the smart output protector device may be interconnected between a power loop and a powered component, and the powered component is short circuited, the smart output protector device may separate the short circuited powered component from the power loop.

In select embodiments, the smart output protector device may further include a green power LED indicating that the power circuit is normal, and a red power LED indicating that a short circuit is present in the power circuit. In this embodiment, a sixth resistor may be included for limiting the voltage to the green power LED, and a seventh resistor may be included for limiting the voltage to the red power LED.

In other select embodiments, the smart output protector device may include a power input terminal box and a power output terminal box. The power input terminal box may house the power positive input and the power negative input. The power output terminal box may house the positive power output and the negative power output.

A system may be included utilizing any of the various embodiments of the smart output protector device as shown or described herein. The system may include: a data output loop, a power loop, or combinations thereof; a data component, a powered component, or combinations thereof; and any of the embodiments of the smart output protector device as shown or described herein. The smart output protector device may be connected between the data output loop and/or the power loop, and the data component and/or the powered component. Wherein, when the component is short circuited, the smart output protector device may separate the short circuited component from the data output loop and/or the power loop.

In select embodiments of the system, the data output loop or the power loop may be used to protect fire alarm control panels (FACP), signaling line circuit (SLC) loop signal, fire alarm control panel (FACP) resettable power, fire alarm control panel (FACP) non-resettable power, conventional fire alarm notification appliance circuit (NAC), burglary alarm polling loop or data loop, power supply, burglary alarm control panel (BACP) auxiliary power loop, access control, direct current power supply loop, the like, other desired data or powered loops, or combinations thereof.

A method of separating a short circuited component from a data output loop or a power loop may be included utilizing any of the various embodiments of the smart output protector device as shown or described herein. The method may include: providing the smart output protector device in any of the various embodiments shown or described herein; and interconnecting the provided smart output protector device between a data output loop, a power loop, or combinations thereof, and a data component, a powered component, or combinations thereof. Whereby, when the component is short circuited, the smart output protector device may separate the short circuited component from the data output loop, the power loop, or combinations thereof.

These and other features of the smart output protector device for fire alarm data loops, burglary alarms, power supplies and/or access controls will become more apparent to one skilled in the art from the prior Summary, and following Brief Description of the Drawings, Detailed Description, and claims when read in light of the accompanying Detailed Drawings.

BRIEF DESCRIPTION OF THE DRAWINGS

The present smart output protector device will be better understood by reading the Detailed Description with reference to the accompanying drawings, which are not necessarily drawn to scale, and in which like reference numerals denote similar structure and refer to like elements throughout, and in which.

Figure 1:
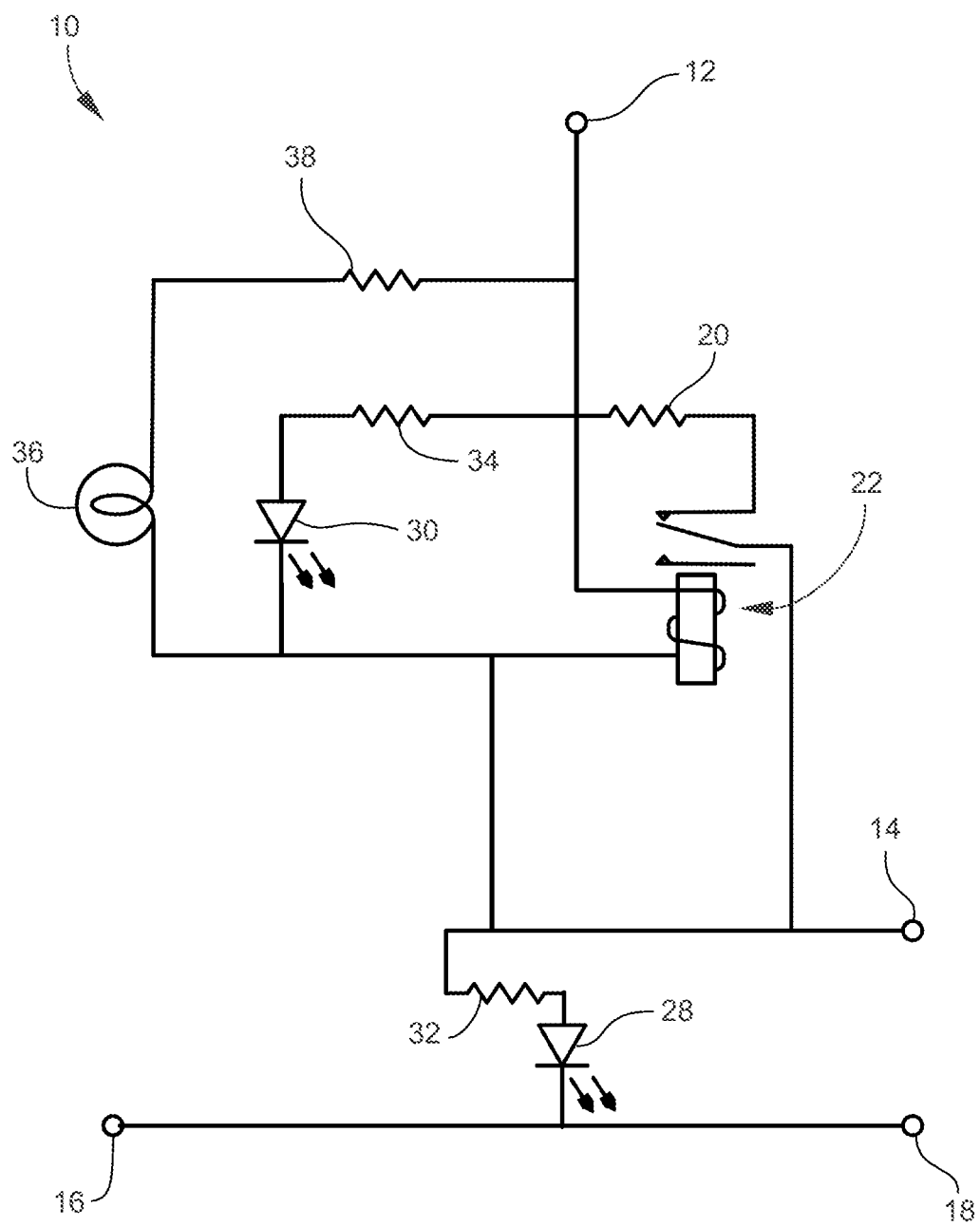
FIG. 1 is a schematic drawing of an example embodiment of the smart output protector device according to the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the example embodiments of the present disclosure, as illustrated in FIGS. 1-11, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

The instant disclosure of smart output protection device 10 may be for use with fire alarm data loops, burglary alarms, power supplies, access controls, the like, other data or power loops desiring separation from short circuits, or combinations thereof. As examples, smart output protection device 10 may prevent fire alarm data loop, burglary alarm, power supplies, Access control, etc. from shutting down because of a short circuit due to a bad or wet device, whereby a fire alarm system, burglar alarm system, the like, or other desired system, etc. is not rendered useless at anytime from a short or short circuit. As such, smart output protection device 10 may be designed to separate a shorted, bad or wet device or devices so that a system may continue to function without a complete shutdown.

The instant disclosure of smart output protection device 10 may be for use with fire alarm data loops, burglary alarms, power supplies, access controls, the like, or other data or power loops desiring protection from short circuits. As examples, smart output protection device 10 may prevent fire alarm data loop, burglary alarm, power supplies, Access control, etc. from shutting down because of a short circuit due to a bad or wet device, whereby a fire alarm system, burglar alarm system, the like, or other desired system, etc. is not rendered useless at anytime from a short or short circuit. As such, smart output protection device 10 may be designed to separate a shorted, bad or wet device or devices so that a system may continue to function without a complete shutdown.

Smart output protection device 10 may connect between the signaling line circuit (SLC) loop, data, notification appliance circuit (NAC) output, power supply output etc., and smoke detectors, horn strobes, motion detectors, card readers, CCTV cameras etc. Whereby, when there is a short, smart output protection device 10 may separate the bad device or devices from the circuit. In general, smart output protector device 10 may operate so that when the output shorts it causes the relay to activate and remove that device or devices from the circuit. As such, by connecting smart output protection device 10 between the SLC loops, Data, NAC output, power supply output etc. and smoke detectors, horn strobes, motion detectors, card readers, CCTV cameras etc., when one or more devices short circuit it will separate it and prevent damage.

As examples, and clearly not limited thereto, when smart output protection device 10 may be placed between a burglary alarm panel auxiliary output and motion detector, glass break detectors etc., device 10 may prevent auxiliary output from shutting down due to bad or wet device or devices. Smart output protection device 10 may also be used to protect access control to prevent system shut down due to bad card reader or wire short circuit. Furthermore, smart output protection device 10 can be used as part of medical devices, in aircraft, in cars etc., or anywhere fuses are used to separate bad devices or short circuits. In sum, smart output protection device 10 may separate a bad or wet device or devices thereby allowing the system to continue to function without a complete shutdown.

As stated above, smart output protector 10 may prevent fire alarm data loop, burglary alarm, power supplies, access controls, the like, etc. from shutting down because of a short circuit due to a bad or wet device. Smart output protector 10 may separate bad or bad devices and prevent damage to alarm panels, power supply outputs, access controls, the like, etc. One feature of smart output protector device 10 may be designed to automatically reset when a short is no longer present. In addition, although smart output protector 10 may be designed for use with fire alarm data loop, burglary alarm, power supplies, access controls, the like, etc., smart output protector device 10 may be used for different products and circuits and may be universal, where it may work with any product on the market whether currently present or later developed.

Referring now to FIG. 1 by way of example, and not limitation, therein is illustrated an example embodiment of smart output protector device 10, wherein the device 10 may generally include data positive input 12, data positive output 14, data negative input 16, data negative output 18, first resistor 20, and first normally closed relay 22. First resister 20 may block direct short circuits. First normally closed relay 22 may separate smart output protector device 10 when opened. In one embodiment, as shown in FIG. 1, first resistor 20 may be interconnected between data positive input 12 and one side of first normally closed relay 22, and the other side of first normally closed relay 22 may be connected to data positive output 14. Whereby, when no short circuit is present in the data circuit, first normally closed relay 22 may interconnect data positive input 12 and data positive output 14. And when a short circuit is present between data positive output 14 and data negative output 18, first relay 22 may open and separate positive data positive input 12 from data positive output 14 and thus remove the short circuit. First resistor 20 may connect to one leg of relay coil 22 and the normally close contact, the other side of relay coil 22 may be tied to the common terminal of relay 22 and data positive output 14. When smart output protector device 10 may be interconnected between data output loop 24 and data component 26, and data component 26 is short circuited, smart output protector device 10 may separate the short circuited data component 26 from data output loop 24.

In select optional embodiments, green data LED 28 may be included for indicating that data circuit 24 is normal and/or red data LED 30 may be included for indicating that a short circuit is present in data circuit 24. In these embodiments, second resistor 32 may be included for limiting the voltage to green data LED 28, and/or third resistor 34 may be included for limiting the voltage to red data LED 30. For example, in use the data LED diagnostics may be under normal operation when green data LED 28 is on and red data LED 30 is off, and change to green power LED 28 is off and red power LED 30 is on when a short circuit or bad device is detected on data loop 24.

In other select optional embodiments, lamp 36 may be included for indicating the status of data circuit 24 and helping to auto reset data circuit 24 when a short is no longer present. In these embodiments, fourth resistor 38 may be included for limiting the voltage to lamp 36.

Figure 2:
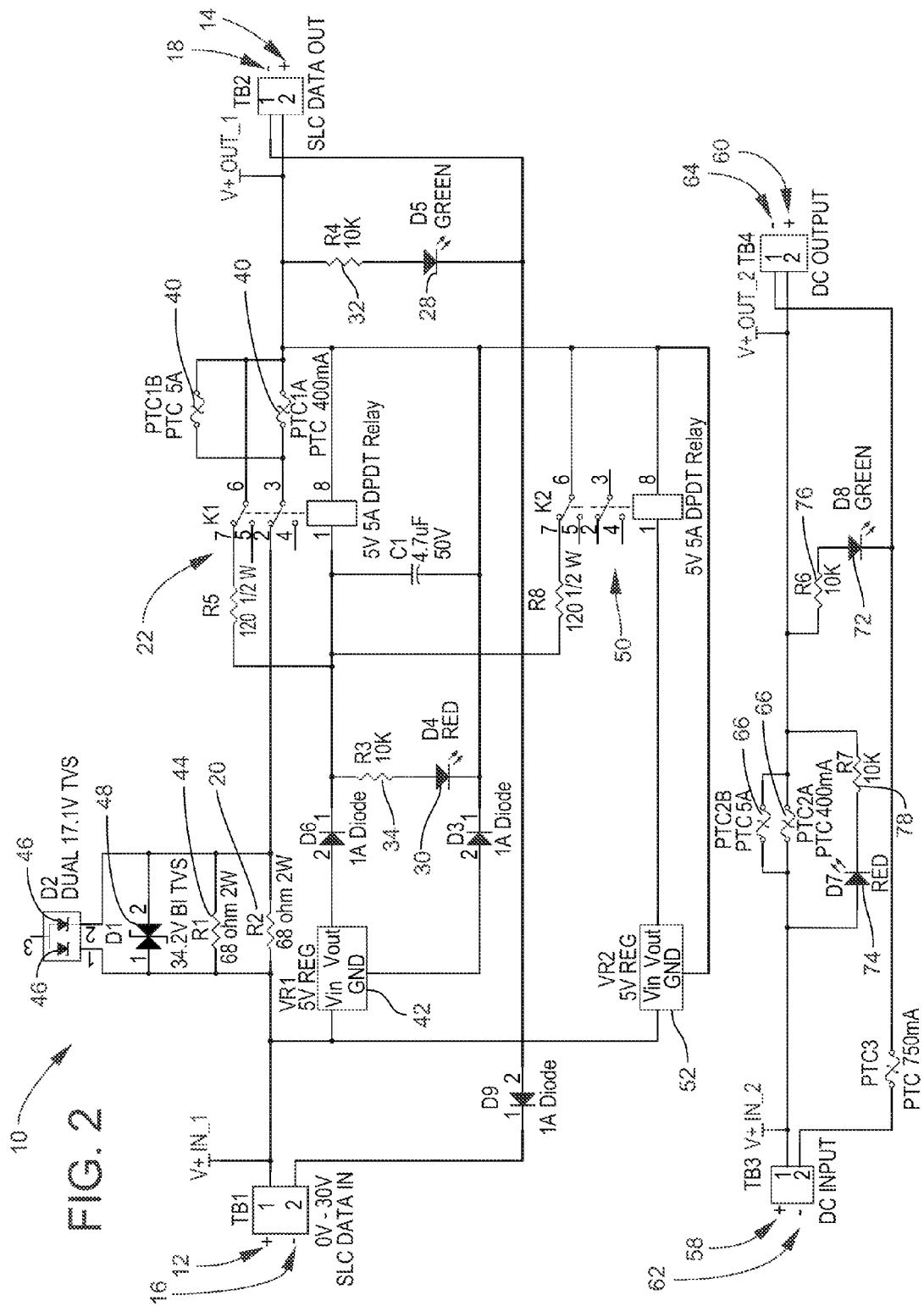
FIG. 2 is a schematic drawing of another example embodiment of the smart output protector device according to the instant disclosure.

Referring now to FIG. 2, a possibly preferred embodiment of smart output protector device 10 is shown. In this embodiment, smart output protector device 10 may include all of the elements of the embodiment shown in FIG. 1, but may also include some additional elements and components for safer and more reliable operation. As shown in FIG. 2, smart output protector device 10 may include data positive input 12, data positive output 14, data negative input 16, data negative output 18, first resistor 20, first normally closed relay 22, green data LED 28, red data LED 30, second resistor 32, and third resistor 34.

At least one resettable data fuse 40 or fuses 40 may be included in select possibly preferred embodiments of smart output protector device 10. Resettable data fuse 40 or fuses 40 may be interconnected between first relay 22 and data positive output 14. Resettable data fuse 40 or fuses 40 may open the connection between first relay 22 and data positive output 14 upon a short circuit. Resettable data fuses 40 may be any resettable data fuse, including, but not limited to, positive temperature coefficient (PTC) fuse, polyfuse, polyswicth, the like, etc. Resettable fuses 40 may allow smart output protector device 10 to automatically reset when a short is no longer present.

First voltage regulator 42 may be included in other select possibly preferred embodiments of smart output protector device 10. First voltage regulator 42 may be used to trigger first normally closed relay 22, whereby first voltage regulator 42 may provide a constant voltage for switching first relay 22 to a normally open state when a short circuit is present.

Fifth resistor 44 may be included in select possibly preferred embodiments of smart output protector device 10. Fifth resistor 44 may be connected in parallel with first resistor 20 for lowering resistance while limiting power once there is a short circuit thereby aiding in blocking direct short circuits.

At least one diode 46, or diode 48, or combinations thereof, may be included in other select possibly preferred embodiments of smart output protector device 10. Diode 46, diode 48, or combinations thereof may be connected in parallel with first resistor 20 for stabilizing the voltage.

Second normally closed relay 50 may be included in select possibly preferred embodiments of smart output protector device 10. In this embodiment, second voltage regulator 52 may also be included where second voltage regulator 52 may trigger second normally closed relay 50. In these embodiments, second normally closed relay 50 and second voltage regulator 52 may be connected in parallel with first normally closed relay 22 and first voltage regulator 42.

Data input terminal box TB1 and data output terminal box TB2 may be included in select possibly preferred embodiments of smart output protector device 10. Data input terminal box TB1 may house data positive input 12 and data negative input 16. Data output terminal box TB2 may house positive data output 14 and negative data output 18.

As shown in FIG. 2, smart output protector device 10 may be designed to not only protect data output loop 24, but in select possibly preferred embodiments may also be designed to protect power loop 68. In these embodiments, smart output protector device 10 may include power positive input 58, power positive output 60, power negative input 62, power negative output 64, and at least one power resettable fuse 66. The power resettable fuse 66 or fuses 66 may be interconnected between power positive input 58 and power positive output 60. In these embodiments, when smart output protector device 10 may be interconnected between power loop 68 and powered component 70, and powered component 70 is short circuited, smart output protector device 10 may separate the short circuited powered component 70 from power loop 68.

Green power LED 72 and/or red power LED 74 may be included in select possibly preferred embodiments of smart output protector device 10. Green power LED 72 may indicate that power circuit 68 is normal, and/or red power LED 74 may indicate that a short circuit is present in power circuit 68. In these embodiments, sixth resistor 76 may be included for limiting voltage to green power LED 72, and seventh resistor 78 may be included for limiting the voltage to red power LED 74. For example, in use the power LED diagnostics may be under normal operation when green power LED 72 is on and red power LED 74 is off, and change to green power LED 72 is off and red power LED 74 is on when a short circuit or bad device is detected on power loop 68.

Power input terminal box TB3 and power output terminal box TB4 may be included in select possibly preferred embodiments of smart output protector device 10. Power input terminal box TB3 may house power positive input 58 and power negative input 62. Power output terminal box TB4 may house positive power output 60 and negative power output 64.

Smart output protector device 10 may be designed to operate on any system 100 with any desired data loop 24 and/or power loop 68. As such, the components (resistors, PTCs, diodes, relays, etc.) of smart output protector device 10 may be sized according to the desired data loop and/or power loop 68. As an example, for standard FACPs, BACPs, DC current power supply panels, access controls, the like, etc., smart output protector device 10 may de designed with the following specifications: normal data operating voltage of 10.5 to 30 VDC (like SLC circuit) (TB1>TB2); normal power operating voltage of 5-30 VDC (like DC circuit) (TB3>TB4); maximum data operating current of 200 mA (like SLC circuit) (TB1>TB2); maximum power operating current of 1 A (like DC circuit) (TB3>TB4); maximum current draw of 14 mA (when red LED is on); outside dimensions of approximately 3.23 inches by 3.15 inches by 2.17 inches; and with indicators including green LED for indicating normal operation and red LED indicates short circuit or bad device detected. In addition, smart output protector device 10 may be provided with built in protection, like reverse polarity protection on the data inputs (12 and 16) of data input terminal block TB1.

For testing smart output protector device 10, a user may short outputs (14 and 18) of data output terminal box TB2 or outputs (60 and 64) of power output terminal box TB4, where green LED (28 or 72) will stop indicating or turn off and red LED (30 or 74) will be lit, indicating a short is present. Once the short is removed from outputs (14 and 18) of data output terminal box TB2 or outputs (60 and 64) of power output terminal box TB4, smart output protector device 10 may return to normal operation with green LED (28 and 72) on or lit and red LED (30 and 74) off or not indicating. Smart output protector device 10 may be protected by resettable fuses 40 and 66 (like PTCs), diodes and at least one relay, where the red LEDs (30 and 74) indicate when smart output protector device 10 may be in a protection mode.

In select embodiments, smart output protector device 10 may be provided in an enclosure. The enclosure may be any desired size or shape. In possibly preferred embodiments, the enclosure may have outside dimensions of approximately 3.23 inches by 3.15 inches by 2.17 inches. The enclosure may also have a box and a cover.

In other select embodiments, smart output protector device 10 may be mountable. This may allow device 10 to be mounted in desired locations, like in dry locations, like indoors. In addition, smart output protector device may be mounted on various indoor locations, like on ceilings, on walls, next to pull stations, next to FACP, auxiliary panel, BACP, smoke detectors, the like, etc. For example, smart output protector device 10 may be secured in its enclosure or box using screws. Device 10 may be removed from its box by removing the screws where connections to data loop 24 and/or power loop 68 may be made and device 10 may be re-secured back in the box or enclosure. Then, the box or enclosure can be installed on the wall using screws and anchors if needed.

Referring now to FIG. 3A-10, system 100 is shown. Systems 100 utilize any of the various embodiments of smart output protector device 10 as shown or described herein. System 100 may generally include: data output loop 24, power loop 68, or combinations thereof; data component 26, powered component 70, or combinations thereof; and any of the embodiments of smart output protector device 10 as shown or described herein. In system 100, smart output protector device 10 may be connected between data output loop 24 and/or power loop 68, and data component 26 and/or powered component 70. Wherein, when component 26 or 70 is short circuited, smart output protector device 10 may separate the short circuited component 26 or 70 from data output loop 24 or power loop 70.

In select embodiments of system 100, data output loop 24 or power loop 68 may be fire alarm control panels (FACP) signaling line circuit (SLC) loop signal, fire alarm control panel (FACP) resettable power, fire alarm control panel (FACP) non-resettable power, conventional fire alarm notification appliance circuit (NAC), burglary alarm polling loop or data loop, power supply, burglary alarm control panel (BACP) auxiliary power loop, access control Data loop, direct current power supply output, access control panel power, or combinations thereof.

Smart output protector device 10 may be wired to system 100 including data loop 24 and/or power loop 68 by any desired means. For example, all wiring may conform to applicable local codes, ordinances and regulations. Smart output protector device 10 may be designed for power limited wiring. An installer may install device 10 in accordance with job drawings and appropriate wiring diagrams. In select embodiments, the minimum wire gage may be designed for 22 AWG, the maximum wire gage may be designed for 16 AWG, where non-metallic conduits may be the only means for a conduit system.

Figure 3A:
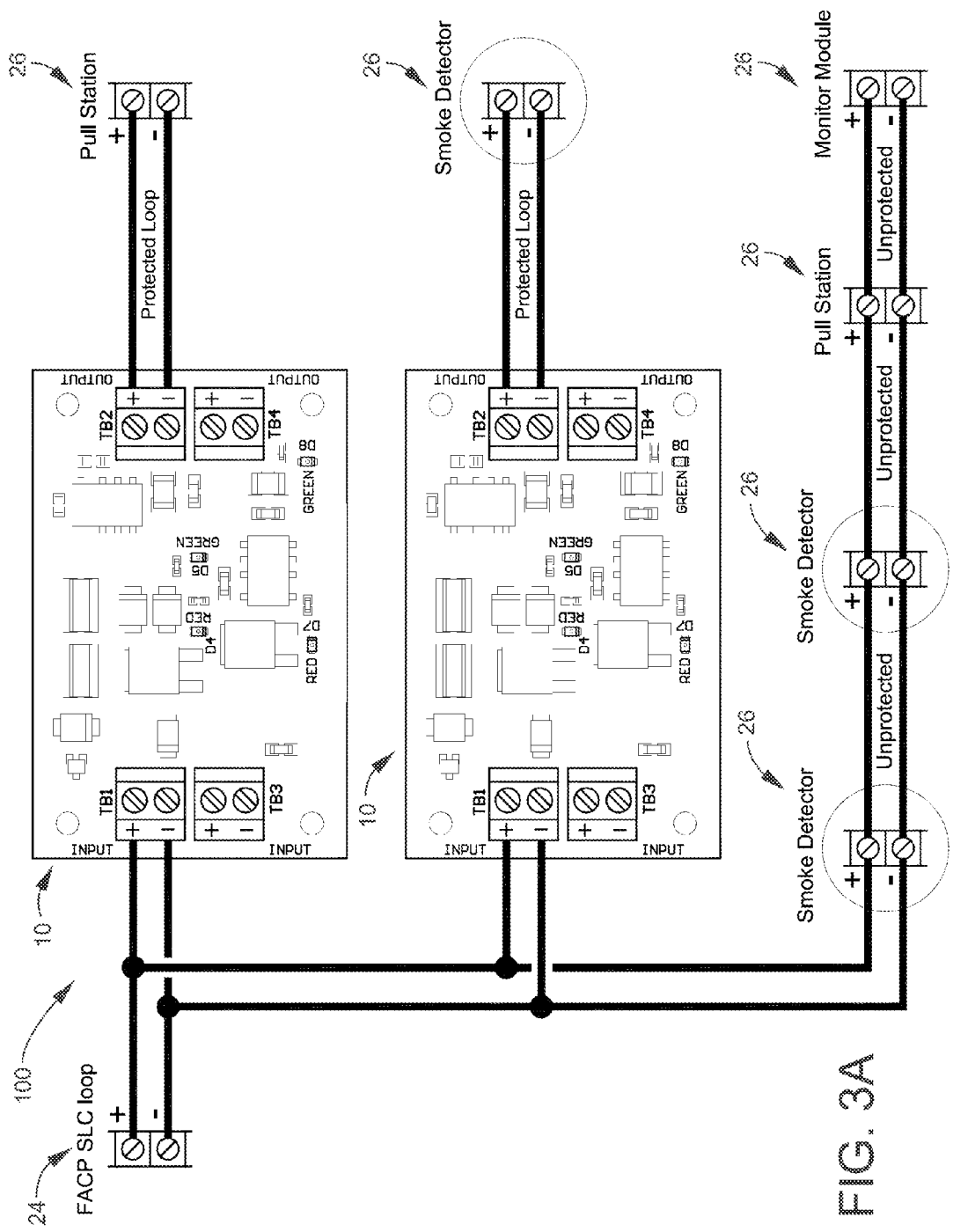
FIG. 3A is an example wiring diagram for fire alarm SLC Loop signal protection using the embodiment from FIG. 2.

Referring specifically now to FIG. 3A, an example wiring diagram for system 100 of a fire alarm control panels (FACP) signaling line circuit (SLC) loop 24 signal protection using smart output protector device 10 is shown. In this example, smart output protector device 10 may be utilized for protecting multiple components 26 of the FACP SLC loop 24, including, but not limited to, pull stations, smoke detectors, monitor modules, the like, etc., individually in a parallel orientation. The first step may be to connect the FACP SLC loop 24 to the inputs (12 and 16) of each of smart output protector devices 10 at each terminal block TB1, with the polarity observed and connected correctly. Then each of the outputs (14 and 18) of terminal TB2 of each of smart output protector devices 10 may be connected to component 26 or multiple components 26 of the FACP SLC loop 24, including, but not limited to, pull stations, smoke detectors, monitor modules, the like, etc. It may be preferred to use multiple smart output protector devices 10 to separate multiple devices or components 26. In addition, this example wiring diagram for system 100 shows how smart output protector device 10 may be utilized to protect component 26 or multiple components 26 of the FACP SLC loop 24 in parallel to an unprotected component 26 or multiple unprotected components 26 of the FACP SLC loop 24. These unprotected components may be connected directly to the FACP SLC loop 24 without using any smart output protector devices 10 therebetween.

Figure 3B:
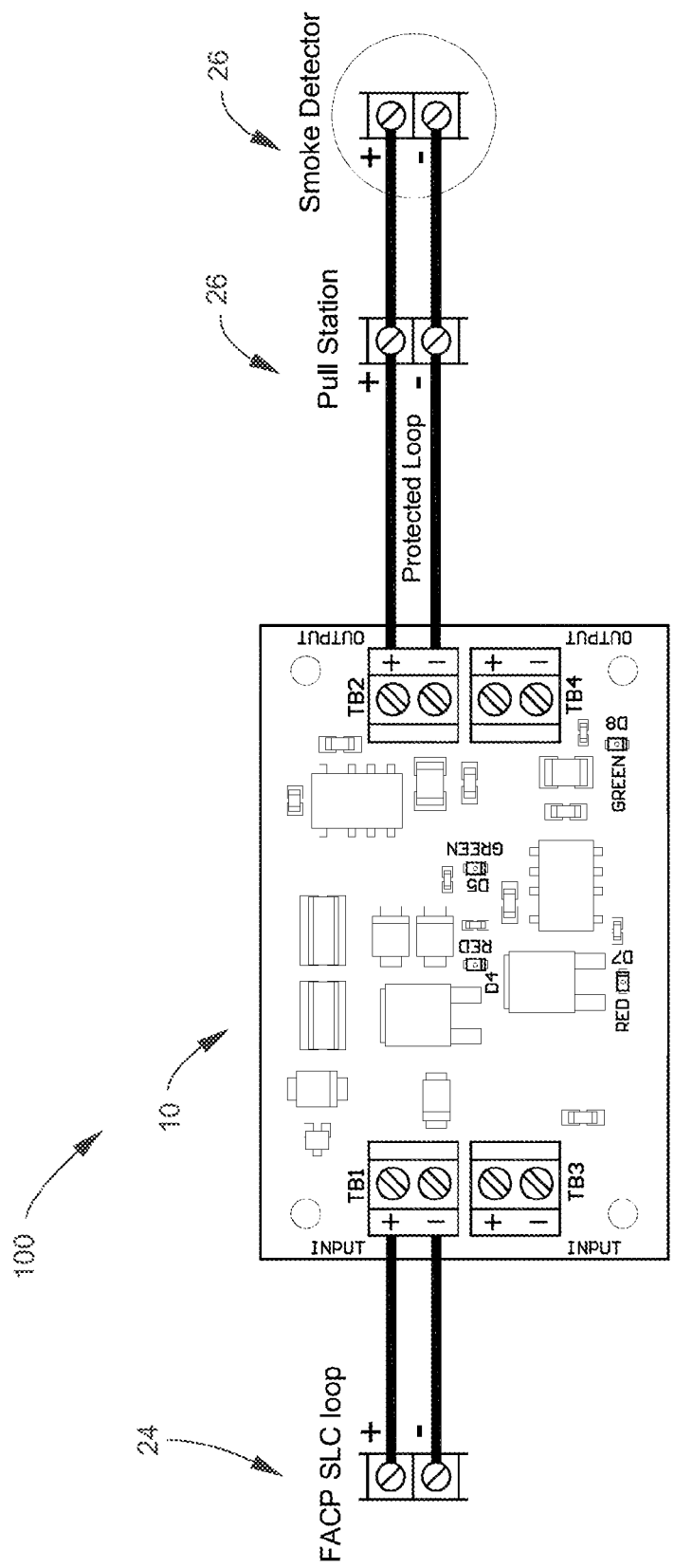
FIG. 3B is another example wiring diagram for fire alarm SLC Loop signal protection using the embodiment from FIG. 2.

Referring specifically now to FIG. 3B, another example wiring diagram for system 100 of a fire alarm control panels (FACP) signaling line circuit (SLC) loop 24 signal protection using smart output protector device 10 is shown. In this example, smart output protector device 10 may be utilized for protecting multiple components 26 of the FACP SLC loop 24, including, but not limited to, pull stations, smoke detectors, monitor modules, the like, etc., individually in zones or groups in a series orientation. The first step may be to connect the FACP SLC loop 24 to the inputs (12 and 16) of smart output protector device 10 at terminal block TB1, with the polarity observed and connected correctly. Then the outputs (14 and 18) of terminal block TB2 of smart output protector device 10 may be connected to multiple components of the FACP SLC loop 24, including, but not limited to, pull stations, smoke detectors, monitor modules, the like, etc. It may be preferred to use multiple smart output protector devices 10 to provide multiple zones or groups.

Figure 4A:
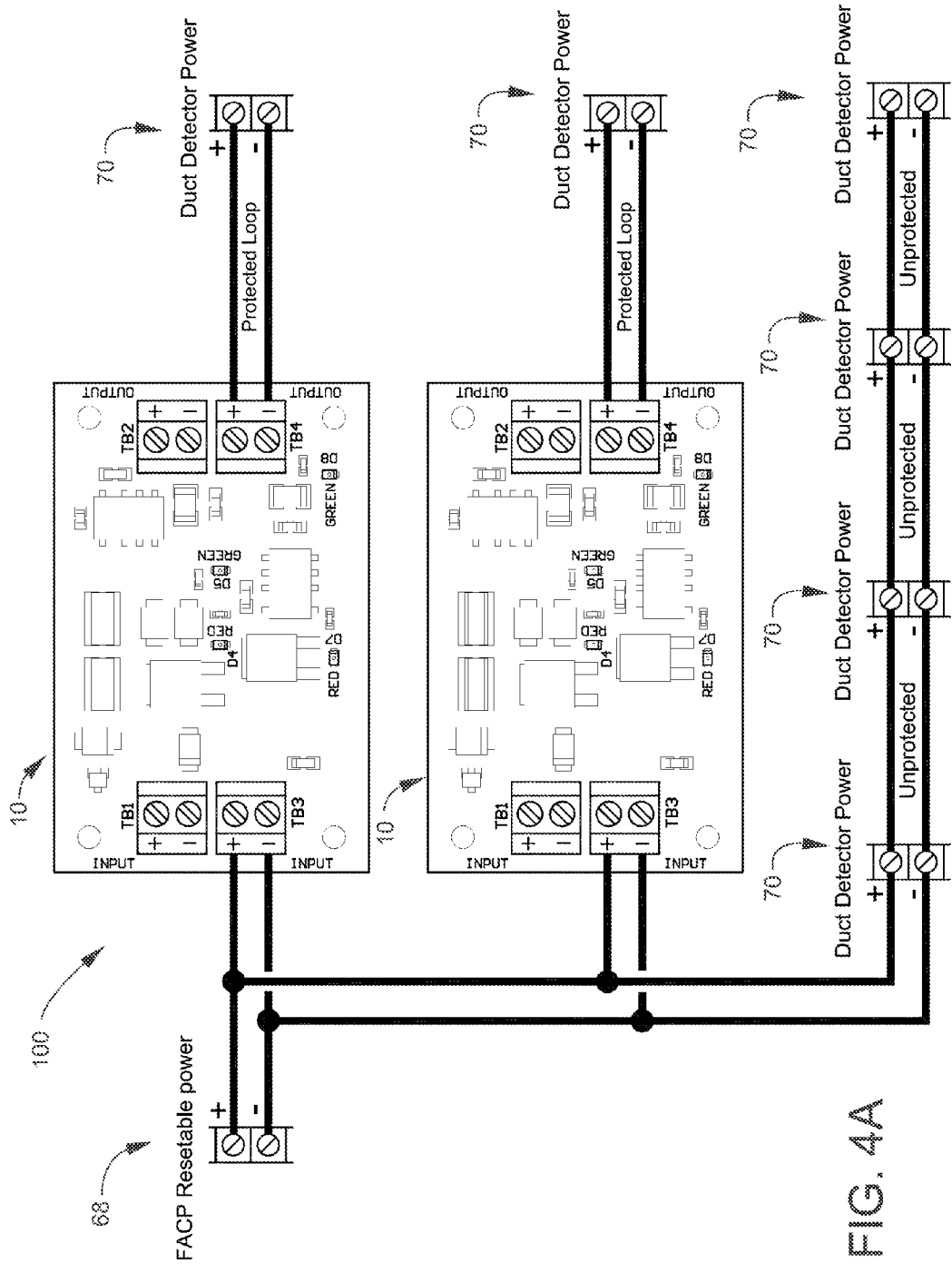
FIG. 4A is an example wiring diagram for fire alarm resettable power protection using the embodiment from FIG. 2.

Referring specifically now to FIG. 4A, an example wiring diagram of system 100 for fire alarm control panel (FACP) resettable power protection using smart output protector device 10 is shown. In this example, multiple smart output protector devices 10 may be utilized for protecting multiple resettable power components 70 of the fire alarm resettable power loop 68, like duct detector power, or other resettable power components, individually in a parallel orientation. The first step may be to connect FACP resettable power loop 68 to the inputs (58 and 62) of each of the smart output protector devices 10 at each terminal block TB3, with the polarity observed and connected correctly. Then each of the outputs (60 and 64) of terminal blocks TB4 of each of the smart output protector devices 10 may be connected to a resettable power component 70 or multiple resettable power components 70 of the FACP resettable power loop 68, like duct detector power or other like resettable power components. It may be preferred to use multiple smart output protector devices 10 to separate multiple resettable power devices or components 70. In addition, this example wiring diagram of system 100 shows how smart output protector device 10 may be utilized to protect resettable power component 70 or multiple resettable power components 70 of the FACP resettable power loop 68 in parallel to an unprotected resettable power component 70 or multiple unprotected resettable power components 70 of the FACP resettable power loop 68. These unprotected resettable power components 70 may be connected directly to the FACP resettable power loop 68 without using any smart output protector devices 10 therebetween.

Figure 4B:
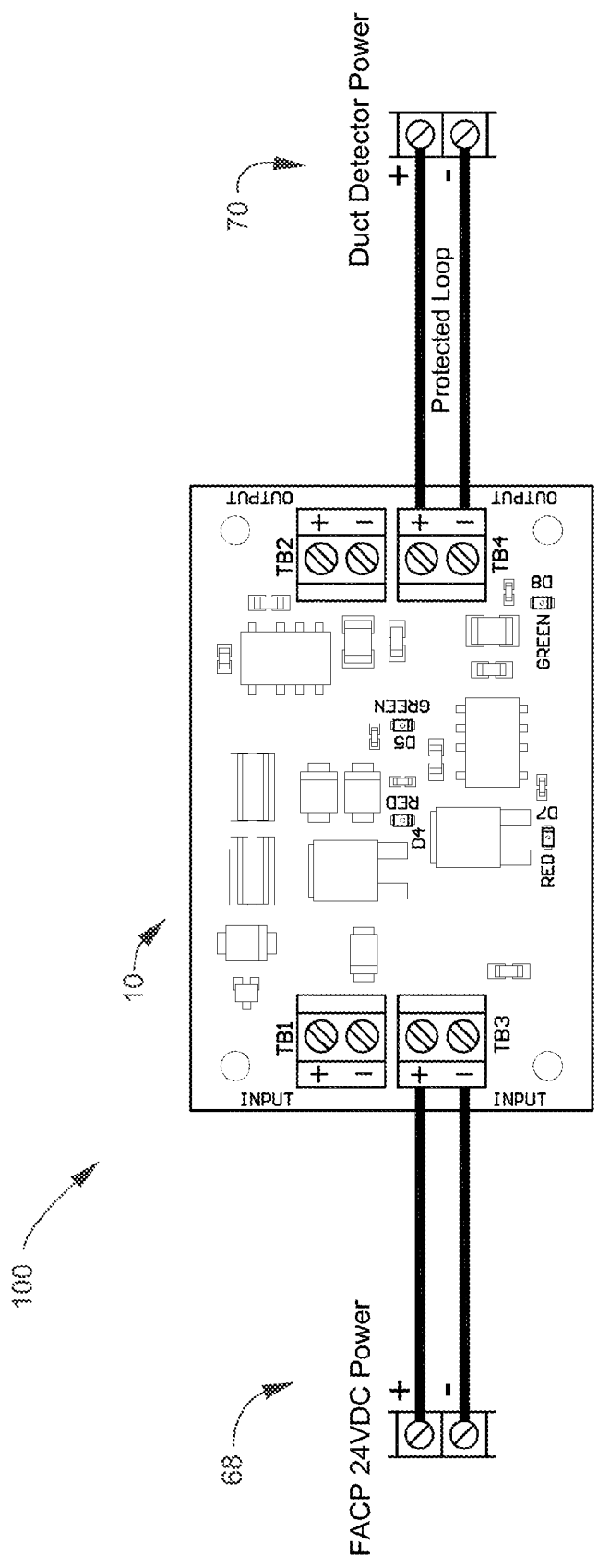
FIG. 4B is an example wiring diagram for fire alarm non-resettable power protection using the embodiment from FIG. 2.

Referring specifically now to FIG. 4B, an example wiring diagram of system 100 for fire alarm control panel (FACP) non-resettable power protection using smart output protector device 10 is shown. In this example, smart output protector device 10 may be utilized for protecting multiple components 70 of the FACP direct current power loop 68 (typically 24 VDC Power) that is non-resettable power, like duct detector power or other like direct current powered components that are non-resettable, individually in zones or groups in a series orientation. The first step may be to connect the FACP direct current loop 68 to the inputs (58 and 62) of smart output protector device 10 at terminal block TB3, with the polarity observed and connected correctly. Then the outputs (60 and 64) of terminal TB4 of smart output protector device 10 may be connected to multiple components 70. It may be preferred to use multiple smart output protector devices 10 to provide multiple zones or groups of direct current powered components 70, or non-resettable power components 70.

Figure 5:
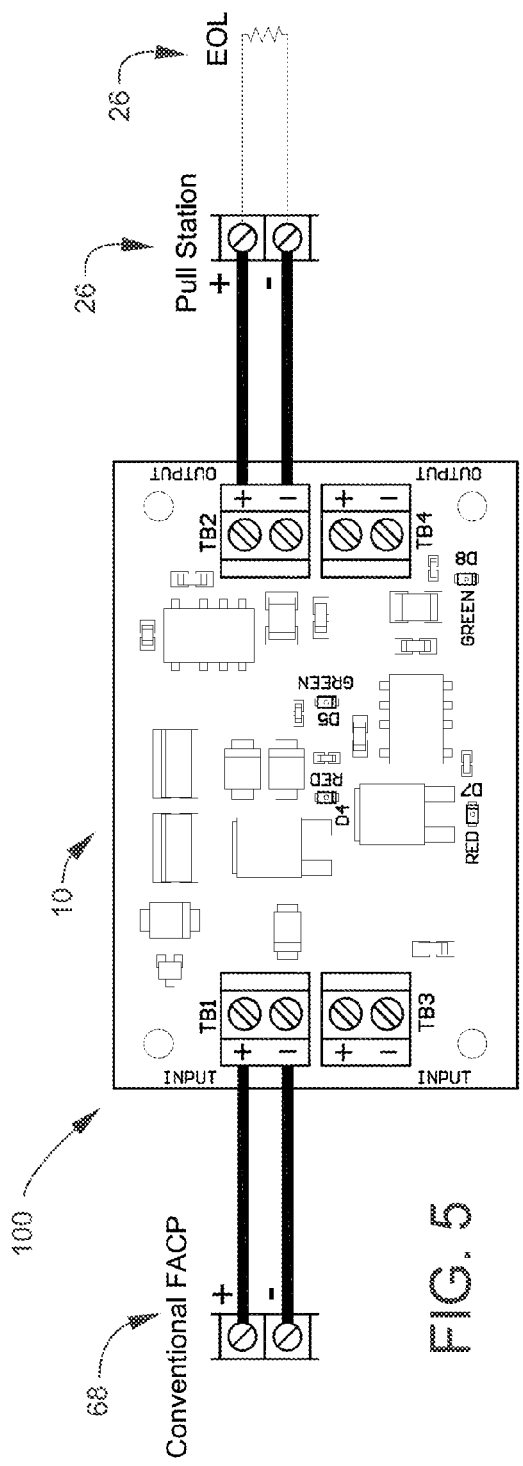
FIG. 5 is an example wiring diagram for conventional fire alarm protection using the embodiment from FIG. 2.

Referring specifically now to FIG. 5, an example wiring diagram of system 100 for conventional fire alarm protection using smart output protector device 10 is shown. In this example, smart output protector device 10 may be utilized for protecting multiple components 26 of a conventional FACP loop 68, like a pull station, smoke detector, water flow switch, etc. and an end of line (EOL) component (resistor at the very end of the fire alarm circuit as the last device—could be manual Call point, smoke/heat detector, etc.), individually in zones or groups in a series orientation. The first step may be to mount smart output protector devices 10 outside the control box. Then, the next step may be to connect the conventional FACP loop 68 to the inputs (12 and 16) of smart output protector device 10 at terminal block TB1, with the polarity observed and connected correctly. Then the outputs (14 and 18) of terminal TB2 of smart output protector device 10 may be connected to multiple components 26 of the conventional FACP loop 26, like a pull station, smoke detector, water flow switch, etc. and an end of line (EOL) component. It may be preferred to use a single smart output protector device 10 for each zone.

Figure 6:
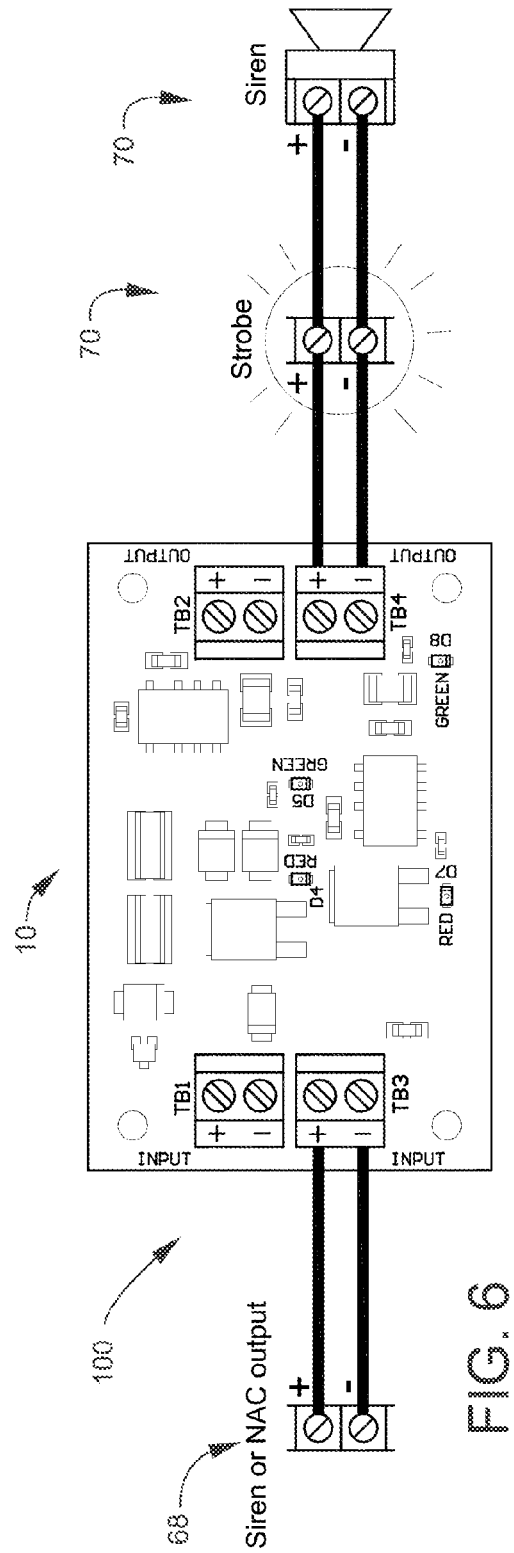
FIG. 6 is an example wiring diagram for siren output and NAC protection using the embodiment from FIG. 2.

Referring specifically now to FIG. 6, an example wiring diagram for system 100 of a siren output and notification appliance circuit (NAC) protection using smart output protector device 10 is shown. In this example, smart output protector device 10 may be utilized for protecting multiple components 70 of the siren or NAC output loop 68, like a strobe, a siren, the like, etc., individually in zones or groups in a series orientation. The first step may be to connect the siren or NAC output loop 68 to the inputs (58 and 62) of smart output protector device 10 at terminal block TB3, with the polarity observed and connected correctly. Then the outputs (60 and 64) of terminal block TB4 of smart output protector device 10 may be connected to multiple components of the siren or NAC output loop 68. It may be preferred to use a single smart output protector devices 10 for each siren or NAC output.

Figure 7:
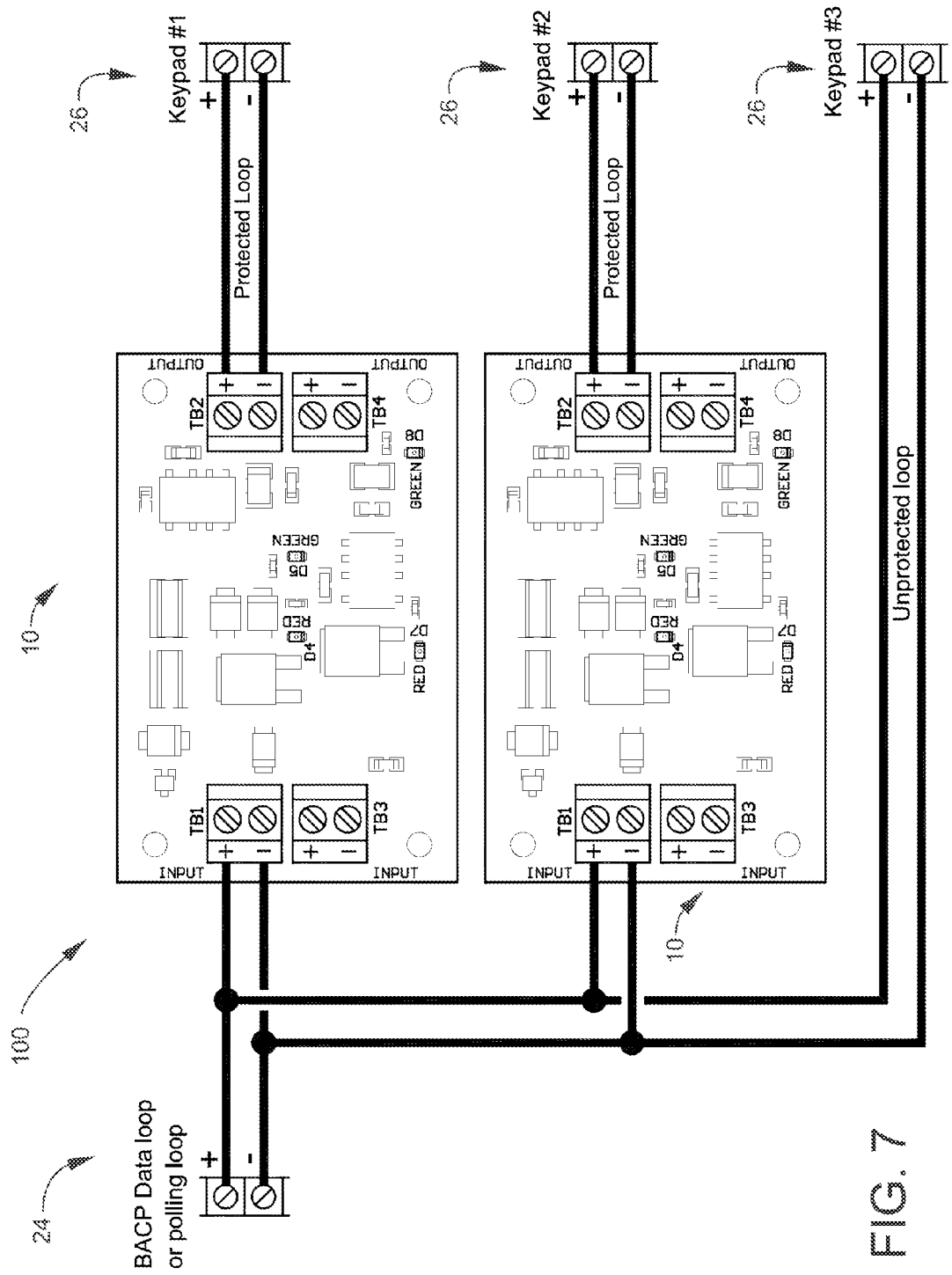
FIG. 7 is an example wiring diagram for burglary alarm polling loop or data loop protection using the embodiment from FIG. 2.

Referring specifically now to FIG. 7, an example wiring diagram for system 100 of a burglary alarm polling loop 24 or data loop 24 protection using smart output protector device 10 is shown. In this example, smart output protector device 10 may be utilized for protecting multiple components 26 of the burglary alarm polling loop 24 or data loop 24, including, but not limited to, keypads or other desired components, etc., individually in a parallel orientation. The first step may be to mount the desired number of smart output protectors 10 outside the control panel/enclosure. Then, the next step may be to connect the burglary alarm polling loop 24 or data loop 24 to the inputs (12 and 16) of each of the smart output protector devices 10 at each terminal block TB1, with the polarity observed and connected correctly. Then each of the outputs (14 and 18) of terminal boxes TB2 of each of the smart output protector devices 10 may be connected to a component 26, like keypads, the like, etc. It may be preferred to use multiple smart output protector devices 10 to separate multiple devices or components 26. In addition, this example wiring diagram shows how smart output protector device 10 may be utilized to protect a component 26 or multiple components 26 of the burglary alarm polling loop 24 or data loop 24 in parallel to an unprotected component or multiple unprotected components 26 of the burglary alarm polling loop 24 or data loop 24, like unprotected keypads. These unprotected components 26 may be connected directly to the burglary alarm polling loop 24 or data loop without using any smart output protector devices 10 therebetween.

Figure 8:
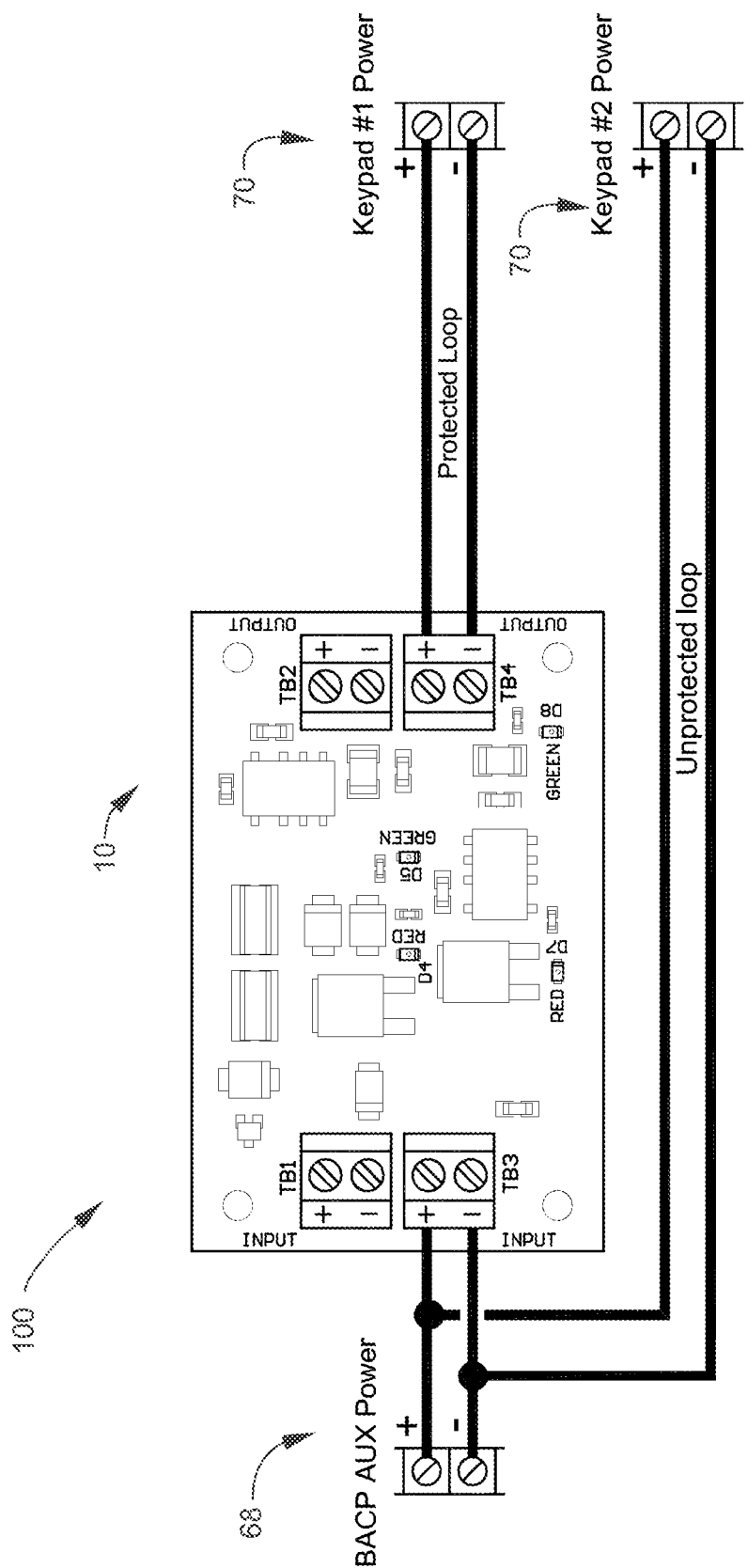
FIG. 8 is an example wiring diagram for power supply protection using the embodiment from FIG. 2.

Referring specifically now to FIG. 8, an example wiring diagram for system 100 of a power supply protection using smart output protector device 10 is shown. In this example, smart output protector device 10 may be utilized for protecting the power supply to components 70 of the burglary alarm control panel (BACP) auxiliary power loop 68, like the power supply for the keypads, motion detectors, glass break detectors, or other like components, individually in zones or groups in a series orientation. The first step may be to connect the BACP auxiliary power loop 68 to the inputs (58 and 62) of smart output protector device 10 at terminal block TB3, with the polarity observed and connected correctly. Then the outputs (60 and 64) of terminal TB4 of smart output protector device 10 may be connected to multiple components 70 of the BACP auxiliary power loop 68. It may be preferred to use multiple smart output protector devices 10 to separate multiple devices 70. In addition, this example wiring diagram shows how smart output protector device 10 may be utilized to protect the power supply of a component 70 of the BACP auxiliary power loop 68 in parallel to an unprotected power supply of the BACP auxiliary power loop 68. These unprotected power supply components 70 may be connected directly to the BACP auxiliary power loop 68 without using any smart output protector devices 10 therebetween.

Figure 9:
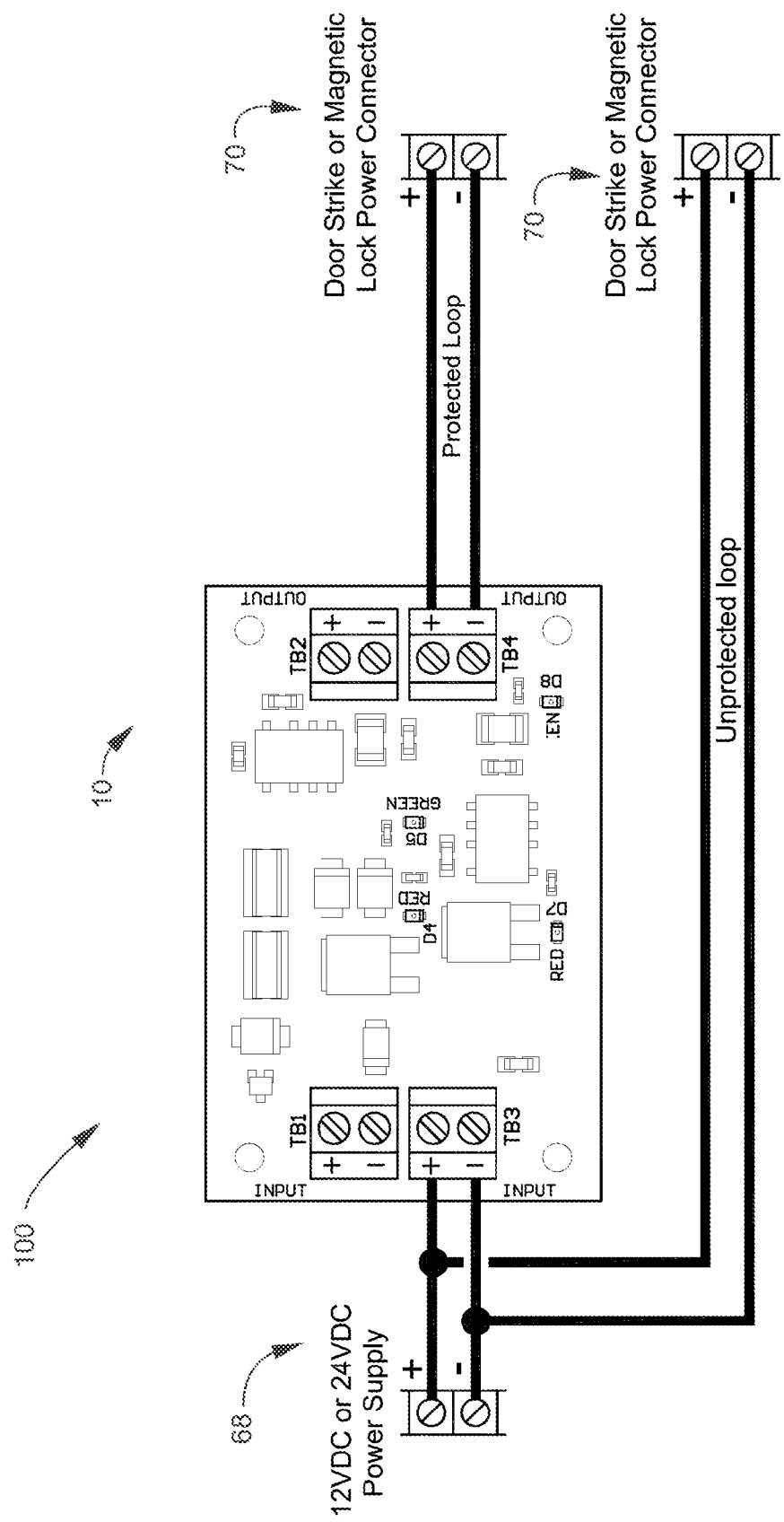
FIG. 9 is an example wiring diagram for access control protection using the embodiment from FIG. 2.

Referring specifically now to FIG. 9, an example wiring diagram for access control protection using smart output protector device 10 is shown. In this example, smart output protector device 10 may be utilized for protecting the direct current (12 VDC or 24 VDC) power supply loop 68 of the access control components 70, like the power supply for the door strikes, magnetic locks, the like, etc., individually in zones or groups in a series orientation. The first step may be to connect the power supply loop 68 of the access control to the inputs (58 and 62) of smart output protector device 10 at terminal block TB3, with the polarity observed and connected correctly. Then the outputs (60 and 64) of terminal TB4 of smart output protector device 10 may be connected to multiple components 70 of the power supply loop 68 of the access control. It may be preferred to use multiple smart output protector devices 10 to separate multiple devices 70. In addition, this example wiring diagram shows how smart output protector device 10 may be utilized to protect the power supply of a component 70 of the power supply loop 68 of the burglary access control in parallel to an unprotected power supply component 70 of the power supply loop 68 of the access control. These unprotected power supply components 70 may be connected directly to the power supply loop 68 of the access control without using any smart output protector devices 10 therebetween.

Figure 10:
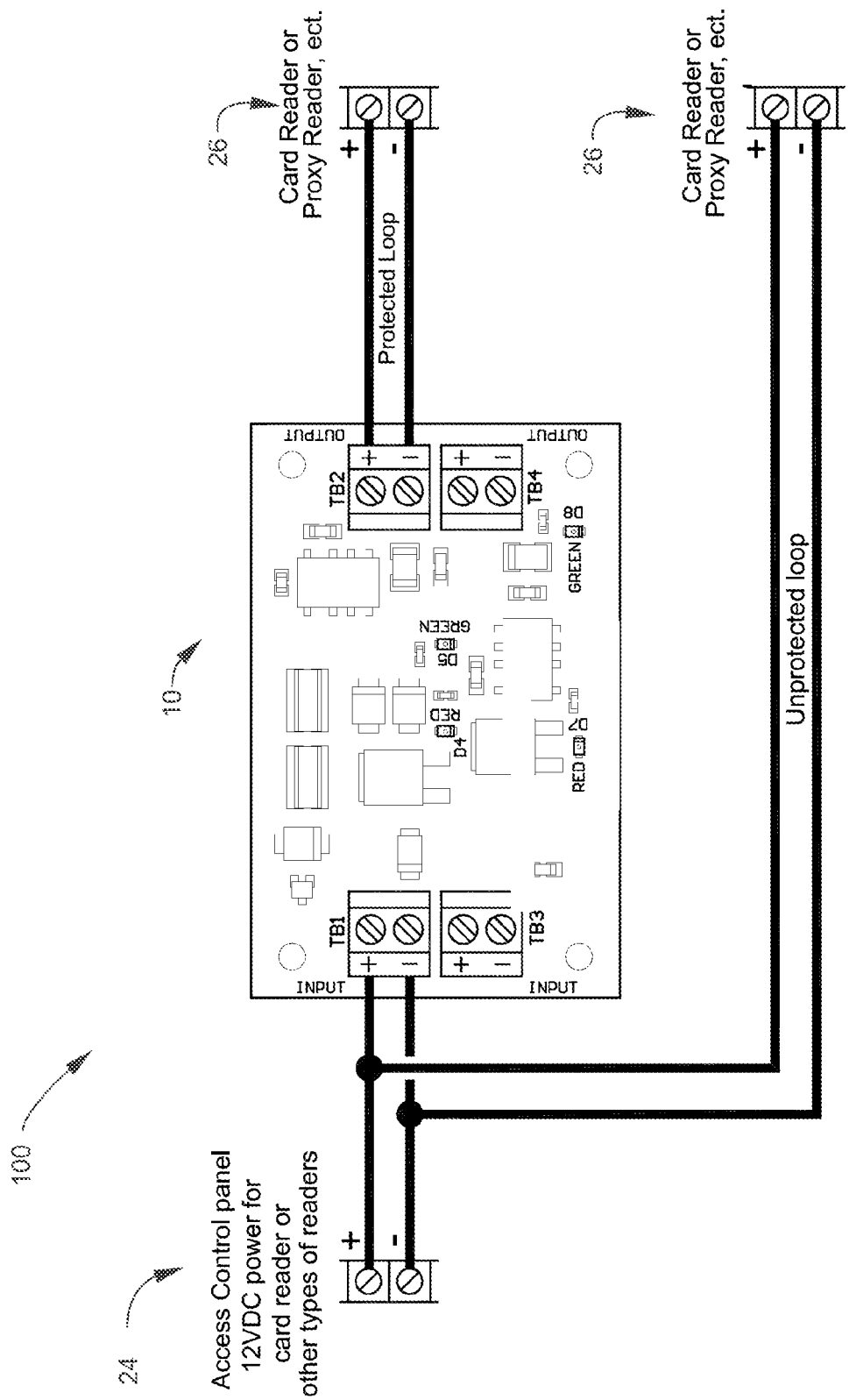
FIG. 10 is another example wiring diagram for access control protection using the embodiment from FIG. 2.

Referring specifically now to FIG. 10, another example wiring diagram for system 100 of an access control protection using smart output protector device 10 is shown. In this example, smart output protector device 10 may be utilized for protecting multiple components 26 of the alarm access control panel power (typically 12 VDC) loop 24 for card reader or other types of readers, including, but not limited to, card readers, proxy readers, or other like components, etc. The first step may be to connect the access control panel power loop 24 for card reader or other types of readers to the inputs (12 and 16) of the smart output protector devices 10 at terminal block TB1, with the polarity observed and connected correctly. Then the outputs (14 and 18) of terminal box TB2 of the smart output protector device 10 may be connected to the card reader, proxy reader, the like, etc. It may be preferred to use multiple smart output protector devices 10 to separate multiple devices or components 26. In addition, this example wiring diagram shows how smart output protector device 10 may be utilized to protect a component 26 or multiple components 26 of the access control panel power loop 24 for card reader or other types of readers in parallel to an unprotected component 26 or multiple unprotected components 26 of the access control panel power loop 24 for card reader or other types of readers, like unprotected card readers, proxy readers, the like, etc. These unprotected components 26 may be connected directly to the access control panel power loop 24 for card reader or other types of readers without using any smart output protector devices 10 therebetween.

Figure 11:
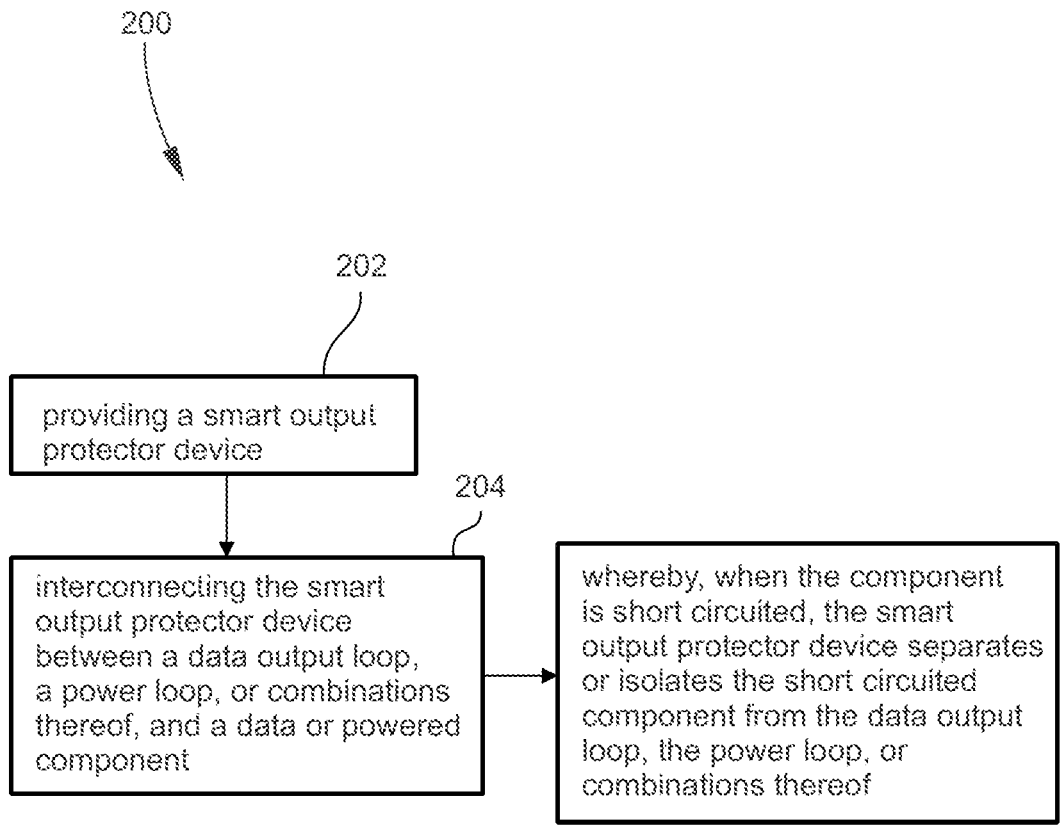
FIG. 11 is a flow chart of one embodiment of a method of separating a short circuited component from a data output loop or power loop according to the instant disclosure.

Referring now to FIG. 11, method 200 of separating a short circuited component from a data output loop or power loop is shown. Method 200 may utilize any of the various embodiments of smart output protector device 10 as shown or described herein. Method 200 of separating a short circuited component from a data output loop or power loop may include: step 202 of providing smart output protector device 10 in any of the various embodiments shown or described herein; and step 204 of interconnecting the provided smart output protector device 10 between data output loop 24, power loop 68, or combinations thereof, and a data component 26 or powered component 70. Whereby, when the component 26 or 70 is short circuited, smart output protector device 10 may separate the short circuited component 26 or 70 from data output loop 24, power loop 68, or combinations thereof.

The foregoing description and drawings comprise illustrative embodiments. Having thus described example embodiments, it should be noted by those skilled in the art that the within disclosures are example only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A smart output protector device comprising:
   a data positive input;
   a data positive output;
   a data negative input;
   a data negative output;
   a first resistor blocking direct short circuits;
   a first normally closed relay separating the smart output protector device when opened;
   a power positive input;
   a power positive output;
   a power negative input;
   a power negative output; and
   at least one power resettable fuse interconnected between said power positive input and said power positive output;
   at least one resettable data fuse interconnected between said first relay and said data positive output, said at least one resettable data fuse opening the connection between said first relay and said data positive output upon a short circuit;
   whereby, when said smart output protector device is interconnected between a power loop and a powered component, and said powered component is short circuited, said smart output protector device separates said short circuited powered component from said power loop, wherein said at least one power resettable fuse and said at least one data resettable fuse participate in protection of the device.

2. The smart output protector device of claim 1 wherein:
   said first resistor is interconnected between said data positive input and one side of said first normally closed relay, and the other side of said first normally closed relay is connected to said data positive output;
   said first relay also being interconnected between said data positive input and said data negative input;
   whereby, when no short circuit is present in the data circuit, said first normally closed relay interconnecting said data positive input and said data positive output, and when a short circuit is present, said first relay opening and disconnecting said data positive input from said data positive output thus protecting the data circuit.

3. The smart output protector device of claim 1 wherein, when said smart output protector device is interconnected between a data output loop and a data component, and said data component is short circuited, said smart output protector device separates said short circuited data component from said data output loop.

4. The smart output protector device of claim 1 further comprising:
   a green data LED indicating that the data circuit is normal; and
   a red data LED indicating that a short circuit is present in the data circuit.

5. The smart output protector device of claim 4 further comprising:
   a second resistor for limiting the voltage to said green data LED; and
   a third resistor for limiting the voltage to said red data LED.

6. The smart output protector device of claim 1 further comprising:
   a lamp for indicating the status of the circuit; and
   a fourth resistor for limiting the voltage to said lamp.

7. The smart output protector device of claim 1 further comprising:
   a first voltage regulator in communication with said first normally closed relay;
   whereby, said first voltage regulator providing a constant voltage to said first relay when a short is present.

8. The smart output protector device of claim 7 further comprising:
   a second normally closed relay; and
   a second voltage regulator in communication with said second normally closed relay;
   said second normally closed relay and said second voltage regulator being connected in parallel with said first normally closed relay and said first voltage regulator.

9. The smart output protector device of claim 1 further comprising a fifth resistor, said fifth resistor being connected in parallel with said first resistor for further liming power once there is a short circuit thereby blocking direct short circuits.

10. The smart output protector device of claim 1 further comprising:
    at least one diode connected in parallel with said first resistor for stabilizing the voltage.

11. The smart output protector device of claim 1 further including:
    a data input terminal box housing said data positive input and said data negative input; and
    a data output terminal box housing said positive data output and said negative data output.

12. The smart output protector device of claim 1 further comprising:
    a green power LED indicating that the power circuit is normal;
    a red power LED indicating that a short circuit is present in the power circuit;
    a sixth resistor for limiting the voltage to said green power LED; and
    a seventh resistor for limiting the voltage to said red power LED.

13. The smart output protector device of claim 1 further including:

a power input terminal box housing said power positive input and said power negative input; and a power output terminal box housing said positive power output and said negative power output.

14. A system comprising:

a data output loop, a power loop, or combinations thereof;

a data component, a powered component, or combinations thereof; and a smart output protector device connected between said data output loop or said power loop, and said data or powered component, said smart output protector device comprising:
  a data positive input;
  a data positive output;
  a data negative input;
  a data negative output;
  a first resistor blocking direct short circuits;
  a first normally closed relay separating the smart output protector device when opened;
  a power positive input;
  a power positive output;
  a power negative input;
  a power negative output; and
  at least one power resettable fuse interconnected between said power positive input and said power positive output;
  at least one resettable data fuse interconnected between said first relay and said data positive output, said at least one resettable data fuse opening the connection between said first relay and said data positive output upon a short circuit;

wherein, when said component is short circuited, said smart output protector device separates said short circuited component from said data output loop or said power loop, where said at least one power resettable fuse and said at least one data resettable fuse participate in protection of the device.

15. The system of claim 14 wherein said data output loop or said power loop being fire alarm control panels (FACP), signaling line circuit (SLC) loop signal, fire alarm control panel (FACP) resettable power, fire alarm control panel (FACP) non-resettable power, conventional fire alarm notification appliance circuit (NAC), burglary alarm polling loop or data loop, power supply, burglary alarm control panel (BACP) auxiliary power loop, access control loop, direct current power supply loop, access control panel power, or combinations thereof.

16. A method of separating or isolating a short circuited component from a data output loop or power loop comprising:

providing a smart output protector device, said smart output protector device comprising:
  a data positive input;
  a data positive output;
  a data negative input;
  a data negative output;
  a first resistor blocking direct short circuits;
  a first normally closed relay separating the smart output protector device when opened;
  a power positive input;
  a power positive output;
  a power negative input;
  a power negative output; and
  at least one power resettable fuse interconnected between said power positive input and said power positive output;
  at least one resettable data fuse interconnected between said first relay and said data positive output, said at least one resettable data fuse opening the connection between said first relay and said data positive output upon a short circuit;

interconnecting said smart output protector device between a data output loop, a power loop, or combinations thereof, and a data component, a powered component, or combinations thereof;

whereby, when said component is short circuited, said smart output protector device separates said short circuited component from said data output loop, said power loop, or combinations thereof, where said at least one power resettable fuse and said at least one data resettable fuse participate in protection of the device.

* * * * *